United States Patent
Hong (10) Patent No.: US 10,690,310 B2
(45) Date of Patent: Jun. 23, 2020

(54) REFLECTOR FOR VEHICLE LAMPS

(71) Applicants: Hyundai Motor Company, Seoul (KR); Kia Motors Corporation, Seoul (KR)

(72) Inventor: Seung Pyo Hong, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/200,381

(22) Filed: Nov. 26, 2018

(65) Prior Publication Data

US 2020/0088377 A1 Mar. 19, 2020

(30) Foreign Application Priority Data

Sep. 17, 2018 (KR) .................. 10-2018-0110758

(51) Int. Cl.
| | | |
|---|---|---|
| *F21S 41/64* | (2018.01) | |
| *F21S 41/32* | (2018.01) | |
| *F21V 7/04* | (2006.01) | |
| *F21V 9/08* | (2018.01) | |
| *F21V 14/00* | (2018.01) | |
| *F21W 102/00* | (2018.01) | |
| *H01F 1/44* | (2006.01) | |

(52) U.S. Cl.
CPC ............... *F21S 41/64* (2018.01); *F21S 41/32* (2018.01); *F21V 7/04* (2013.01); *F21V 9/08* (2013.01); *F21V 14/003* (2013.01); *F21W 2102/00* (2018.01); *H01F 1/44* (2013.01)

(58) Field of Classification Search
CPC ........ F21S 41/635; F21S 41/64; F21S 41/645; F21V 7/048
See application file for complete search history.

(56) References Cited

U.S. PATENT DOCUMENTS

| | | | |
|---|---|---|---|
| 8,508,126 B1* | 8/2013 | Morejon | F21V 9/30 313/506 |
| 9,977,235 B2* | 5/2018 | Ramer | G02B 26/005 |
| 2005/0152153 A1* | 7/2005 | Amano | F21V 5/04 362/520 |
| 2007/0274096 A1* | 11/2007 | Chew | F21V 31/04 362/609 |
| 2008/0043466 A1* | 2/2008 | Chakmakjian | F21V 5/007 362/237 |
| 2009/0262536 A1* | 10/2009 | Hoelen | F21V 5/04 362/257 |
| 2012/0013238 A1* | 1/2012 | Jonsson | F21V 5/04 313/110 |

(Continued)

FOREIGN PATENT DOCUMENTS

JP 2015-115276 A 6/2015

*Primary Examiner* — Bryon T Gyllstrom
*Assistant Examiner* — Colin J Cattanach
(74) *Attorney, Agent, or Firm* — Morgan, Lewis & Bockius LLP (57) ABSTRACT

A reflector device configured for vehicle lamps which is configured for causing light to exit along a plurality of paths using a single light source and a single reflector, may include a fluid, the position of which is changed in a response to magnetism, is provided at the reflector such that the exit path of light is changed depending on the flow of the fluid, whereby it is possible to realize a lamp having various functions.

14 Claims, 6 Drawing Sheets

(56) References Cited

U.S. PATENT DOCUMENTS

2015/0138788 A1* 5/2015 Lee ................... F21K 9/60
362/478
2015/0184829 A1* 7/2015 Baek .................. F21S 10/005
362/235
2017/0363270 A1* 12/2017 Ramer ................ F21V 14/003

* cited by examiner

REFLECTOR FOR VEHICLE LAMPS

CROSS-REFERENCE TO RELATED APPLICATION

The present application claims priority to Korean Patent Application No. 10-2018-0110758, filed on Sep. 17, 2018 in the Korean Intellectual Property Office, the entire contents of which is incorporated herein for all purposes by this reference.

BACKGROUND OF THE INVENTION

Field of the Invention

The present invention relates to a reflector device for vehicle lamps which is capable of changing the emission direction of light using a single light source and a single reflector.

Description of Related Art

In general, a vehicle is provided with a lamp device for facilitating a driver to clearly see objects ahead of the vehicle while driving at night and for informing other vehicles or people on a sidewalk of the traveling state thereof. A lamp, which is also called a headlamp, is a light lamp for throwing light ahead of a vehicle in the direction in which the vehicle advances.

Lamps are classified into a headlamp, a fog lamp, a turn signal, a brake lamp, and a backup light, which have differently set directions in which light is emitted to a road.

To realize various kinds of lighting using such a lamp, it is necessary for the lamp to include a light source, a reflection surface, and a lens, whereby the layout of the lamp is increased.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a reflector device configured for vehicle lamps which is configured for changing the emission direction of light using a single light source and a single reflector.

In accordance with various aspects of the present invention, the above and other objects may be accomplished by the provision of a reflector device configured for vehicle lamps including a light source unit for emitting light, a variable reflector having therein a reaction fluid that reacts to magnetism and a non-reaction fluid that does not react to the magnetism, the variable reflector being configured to have a portion located in a movement path of light emitted from the light source unit and a portion located to deviate from the movement path of light, the portion located in the movement path of light being configured to reflect incident light such that the light exits to the outside, and an electromagnet unit mounted at the variable reflector for selectively generating magnetism to control a fluid flow such that the reaction fluid or the non-reaction fluid is disposed in the movement path of light, whereby the light is reflected by one of the reaction fluid and the non-reaction fluid or is transmitted through the other of the reaction fluid and the non-reaction fluid and then reflected by the variable reflector to adjust the exit direction of light.

The reaction fluid and the non-reaction fluid may be configured to have different densities. The reaction fluid may be polar, and the non-reaction fluid may be nonpolar.

The variable reflector may include a bent reflection unit located in the movement path of light for reflecting light and a reception unit formed to communicate with the bent reflection unit, the reception unit extending to deviate from the movement path of light. The reaction fluid and the non-reaction fluid may be disposed in the bent reflection unit and the reception unit to flow therebetween.

The bent reflection unit may include a reflection panel extending from the reception unit and formed to be bent such that incident light is reflected thereby and exits to the outside, a transparent panel extending from the reception unit, spaced from the reflection panel toward the light source unit, and formed to be bent for transmitting light, and a lens connecting the transparent panel and the reflection panel for defining an internal space in which the reaction fluid and the non-reaction fluid are disposed, whereby the exit direction of light which is reflected by the transparent panel due to the reaction fluid or the non-reaction fluid filling the internal space and then moves may be different from the exit direction of light which is transmitted through the non-reaction fluid or the reaction fluid, is reflected by the reflection panel, and then moves.

The variable reflector may further include an additional reflection unit disposed to correspond to the exit direction of light which is reflected by the reflection panel or the transparent panel and then moves for changing the exit direction of incident light.

The variable reflector may further include a color lens unit disposed so at to correspond to the exit direction of light which is reflected by the reflection panel or the transparent panel and then moves for changing the color of incident light.

The bent reflection unit may be located to correspond to the direction in which light is emitted from the light source unit, the reception unit may be formed to be located on the side opposite to the emission direction of light, and the bent reflection unit may extend to the reception unit such that the reaction fluid and the non-reaction fluid may be connected to each other to flow therebetween.

The bent reflection unit may be formed to extend to the light source unit, and may be formed such that the section of the bent reflection unit facing the light source unit is planar.

The bent reflection unit may be provided at the end portion thereof from which light exits with a plurality of protrusions for diffusing exit light.

The electromagnet unit may be mounted at the reception unit such that, when magnetism is generated from the electromagnet unit, the reaction fluid moves and is disposed in the reception unit and the non-reaction fluid is disposed in the bent reflection unit.

The variable reflector may include a linear reflection unit, formed to extend the movement path of light for reflecting incident light such that the light exits to the outside, and an internal reception unit, formed to communicate with the linear reflection unit, the internal reception unit being formed to deviate from the movement path of light. The reaction fluid and the non-reaction fluid may be disposed in the linear reflection unit and the internal reception unit to flow therebetween.

The end portion of the linear reflection unit, on which light emitted from the light source unit is incident, may be formed to be inclined, whereby the movement path of light is changed when the light is reflected by the reaction fluid or the non-reaction fluid filling the linear reflection unit.

The linear reflection unit and the internal reception unit may be formed to extend linearly and may be disposed to overlap each other, and the electromagnet unit may be mounted at the internal reception unit such that, when magnetism is generated from the electromagnet unit, the reaction fluid moves and is disposed in the internal reception unit and the non-reaction fluid is disposed in the linear reflection unit.

The linear reflection unit may be provided at the section thereof that overlaps the internal reception unit, with a plurality of optics.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of a reflector device configured for vehicle lamps according to an exemplary embodiment of the present invention will be described with reference to the accompanying drawings.

Figure 4:
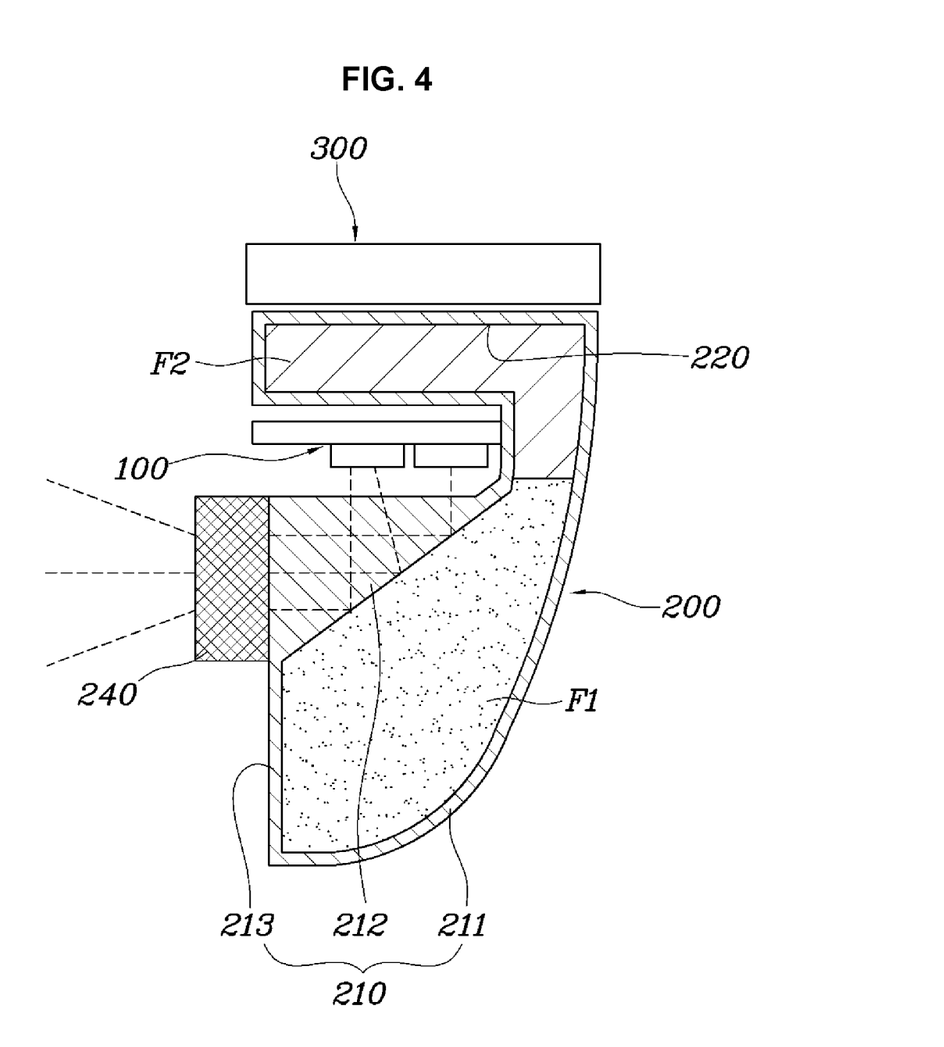
Figure 5:
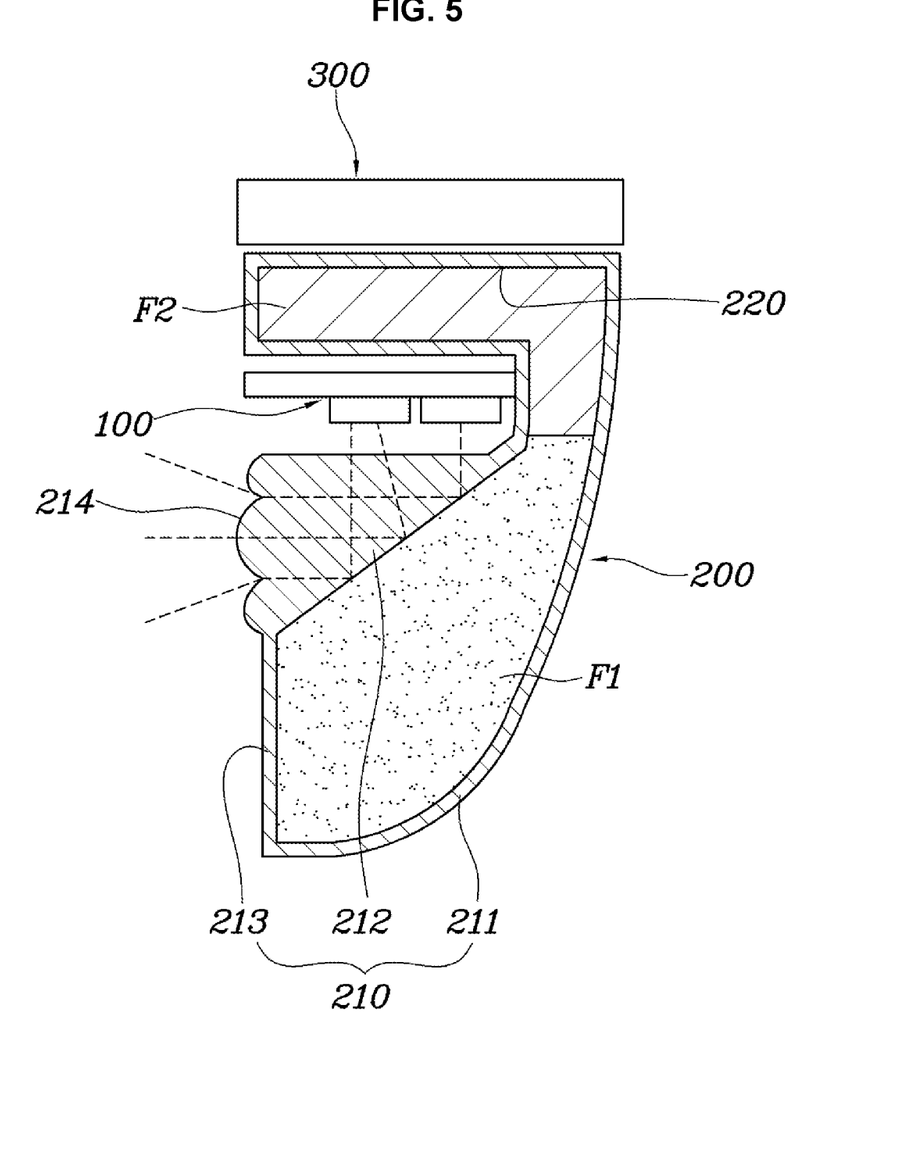
Figure 6:
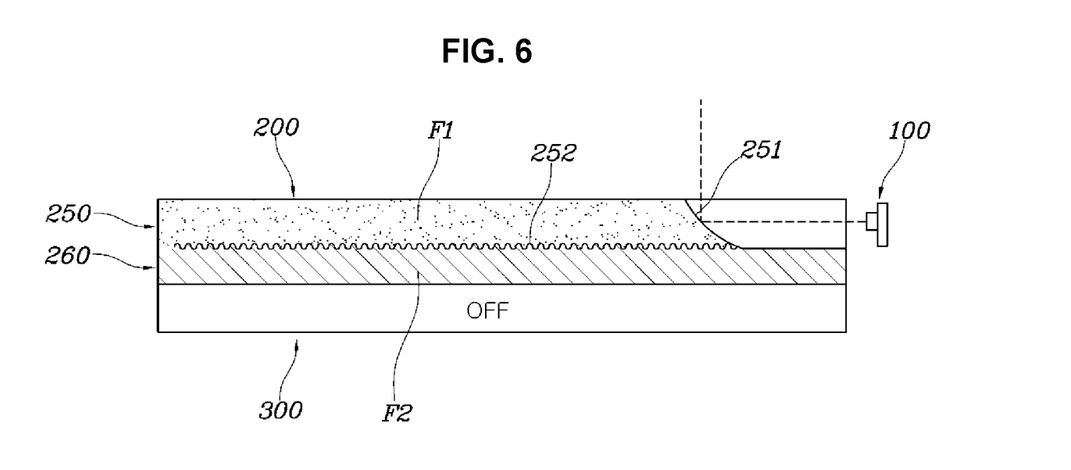
FIG. 6 and FIG. 7 are views showing a reflector device for vehicle lamps according to various exemplary embodiments of the present invention.
Figure 7:
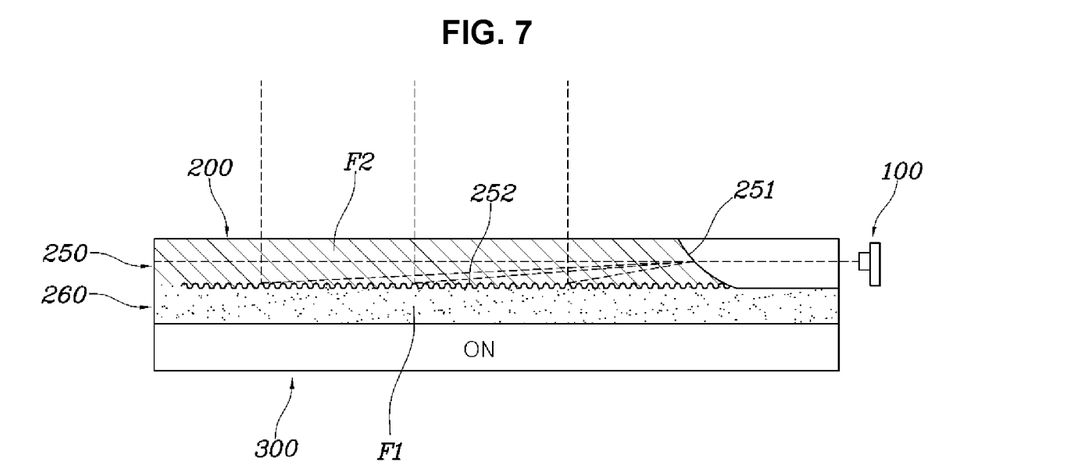

FIG. 1, FIG. 2, FIG. 3, FIG. 4, and FIG. 5 are views showing a reflector device configured for vehicle lamps according to various exemplary embodiments of the present invention, and FIG. 6 and FIG. 7 are views showing a reflector device configured for vehicle lamps according to various exemplary embodiments of the present invention.

Figure 1:
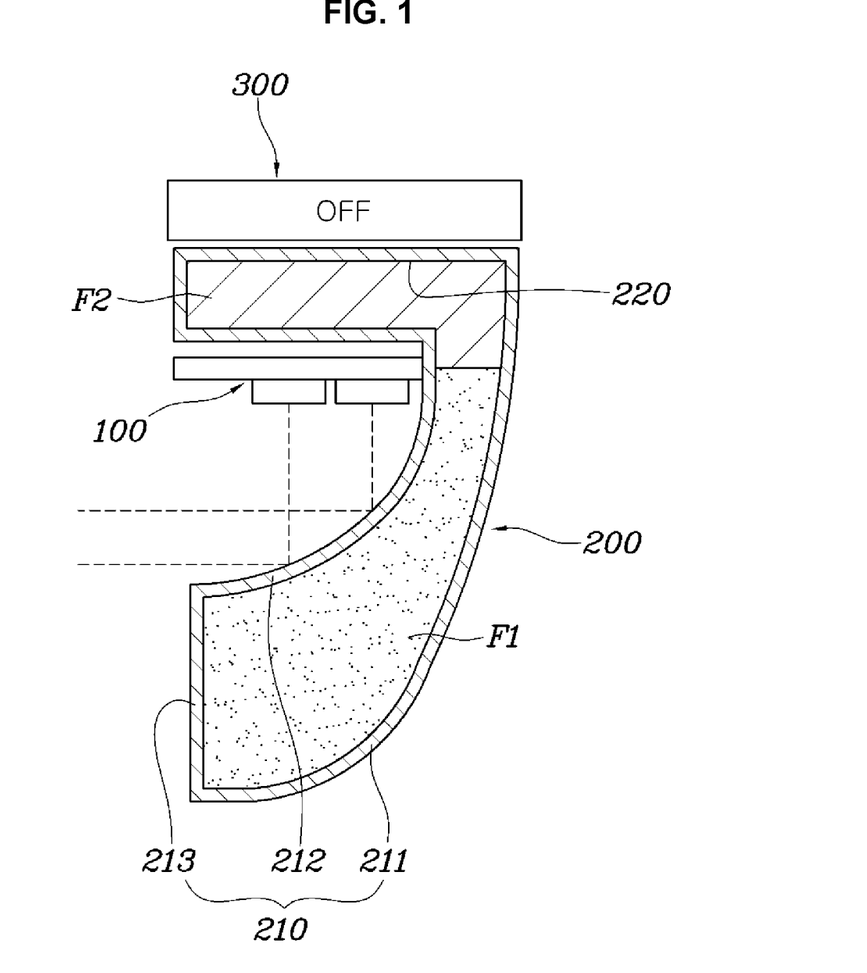
FIG. 1, FIG. 2, FIG. 3, FIG. 4, and FIG. 5 are views showing a reflector device for vehicle lamps according to various exemplary embodiments of the present invention.
Figure 2:
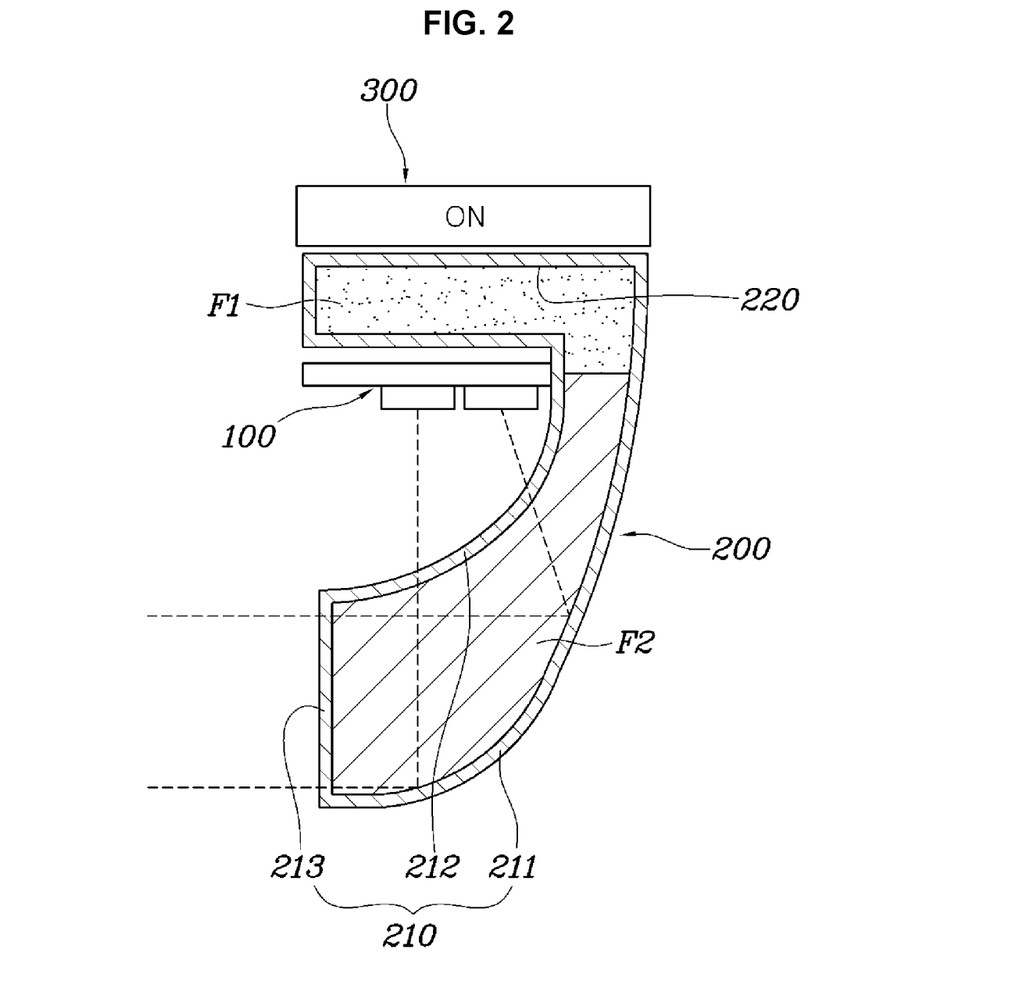

As shown in FIG. 1 and FIG. 2, the reflector device configured for vehicle lamps according to an exemplary embodiment of the present invention may include a light source unit 100 for emitting light, a variable reflector 200 having therein a reaction fluid F1 that reacts to magnetism and a non-reaction fluid F2 that does not react to the magnetism, the variable reflector 200 being configured to have a portion located in the movement path of light emitted from the light source unit 100 and a portion located to deviate from the movement path of light, the portion located in the movement path of light being configured to reflect incident light such that the light exits to the outside, and an electromagnet unit 300 mounted at the variable reflector 200 for selectively generating magnetism to control a fluid flow such that the reaction fluid F1 or the non-reaction fluid F2 is disposed in the movement path of light, whereby the light is reflected by one of the reaction fluid F1 and the non-reaction fluid F2 or is transmitted through the other of the reaction fluid F1 and the non-reaction fluid F2 and then reflected by the variable reflector 200 to adjust the exit direction of light. Here, the exit direction of light is the direction in which the light is finally emitted out of a vehicle. The light may be emitted to a region ahead of the vehicle or to a load.

In an exemplary embodiment of the present invention, the light emitted from the light source unit 100 is reflected by the variable reflector 200 and then exits to the outside. The movement direction of light that exits to the outside is changed depending on the position of the reaction fluid F1 and the non-reaction fluid F2 in the variable reflector 200.

Here, the variable reflector 200 has a portion located in the movement path of light and a portion located to deviate from the movement path of light. Depending on the position of the reaction fluid F1 and the non-reaction fluid F2, the light may be reflected by the fluid or may be transmitted through the fluid and then reflected by the variable reflector 200, whereby the exit direction of light is adjusted. To the present end, the electromagnet unit 300 is mounted at the variable reflector 200. The reaction fluid F1 is configured to react to magnetism, and the non-reaction fluid F2 is configured not to react to magnetism. When magnetism is generated from the electromagnet unit 300, therefore, the reaction fluid F1 may move to the electromagnet unit 300, whereby the reaction fluid F1 may be disposed in the movement path of light or may be disposed to deviate from the movement path of light. Alternatively, the non-reaction fluid F2 may be disposed to deviate from the movement path of light or may be disposed in the movement path of light. In the present way, the reflection position of light may be changed depending on the position of the reaction fluid F1 and the non-reaction fluid F2 in the variable reflector 200, and the exit direction of light may be adjusted depending on the reflection position of light.

The reaction fluid F1 and the non-reaction fluid F2 for changing the reflection position of light will be described in detail. The reaction fluid F1 and the non-reaction fluid F2 may be configured to have different densities. The reaction fluid F1 may be polar, and the non-reaction fluid F2 may be nonpolar.

That is, the reaction fluid F1 and the non-reaction fluid F2 have different densities, whereby differences in the refractive index and reflectance of light therebetween occur. For example, in the case in which the reaction fluid F1 and the non-reaction fluid F2 are disposed in the movement path of light in the state in which the density of the reaction fluid F1 is higher than that of the non-reaction fluid F2, the light may be transmitted through the non-reaction fluid F2 while being refracted by the non-reaction fluid F2, and may then be partially or totally reflected by the reaction fluid F1, whereby the movement path of light may be changed. This is based on Snell's law. The reflection position of light in the variable reflector 200 may be changed using a difference in the reflectance between the reaction fluid F1 and the non-reaction fluid F2.

Meanwhile, the reaction fluid F1 and the non-reaction fluid F2 may be configured such that the reaction fluid F1 and the non-reaction fluid F2 have different densities and such that the reaction fluid F1 reacts to magnetism and the non-reaction fluid F2 does not react to the magnetism. The reason for this is that it is necessary to change the position of the reaction fluid F1 and the non-reaction fluid F2 to change the reflection position of light. The reaction fluid F1 may move depending on whether magnetism is generated from the electromagnet unit 300 mounted at the variable reflector 200, and the non-reaction fluid F2 may be moved by the reaction fluid F1.

To satisfy a difference in the density between the reaction fluid F1 and the non-reaction fluid F2 and magnetism reaction conditions thereof, the reaction fluid F1 may be water or mercury, which has relatively high density and is polar (or metallic), and the non-reaction fluid F2 may be benzene or toluene, which has relatively low density and is nonpolar. In the present way, the reflection position of light in the reaction fluid F1 and the non-reaction fluid F2 may be differently set using materials having different densities and polarities as the reaction fluid F1 and the non-reaction fluid F2.

As shown in FIG. 1, therefore, the variable reflector 200 may be configured to have a portion located in the movement path of light emitted from the light source unit 100 and a portion located to deviate from the movement path of light, and the electromagnet unit 300 may be mounted at the portion located to deviate from the movement path of light. When the electromagnet unit 300 is turned off, as shown in FIG. 1, the reaction fluid F1 is disposed in the portion located in the movement path of light, and the non-reaction fluid F2 is disposed in the portion located to deviate from the movement path of light, whereby the light emitted from the light source unit 100 is reflected by the reaction fluid F1. Here, the reaction fluid F1 may move downwards due to the weight thereof, since the density of the reaction fluid F1 is higher than that of the non-reaction fluid F2.

Meanwhile, when the electromagnet unit 300 is turned on, as shown in FIG. 2, the reaction fluid F1 is disposed in the portion located to deviate from the movement path of light due to the magnetism of the electromagnet unit 300, and the non-reaction fluid F2 is disposed in the portion located in the movement path of light, whereby the light emitted from the light source unit 100 is transmitted through the non-reaction fluid F2 and is then reflected by a reflecting surface of the variable reflector 200.

In the present way, the reflection position of light may be changed depending on the position of the reaction fluid F1 and the non-reaction fluid F2 based on turning on/off of the electromagnet unit, whereby it is possible to change the exit direction of light using a single light source unit 100 and a single variable reflector 200.

Various embodiments may be applied to the variable reflector.

As various exemplary embodiments of the present invention, as shown in FIG. 1, FIG. 2, FIG. 3, FIG. 4, and FIG. 5, the variable reflector 200 includes a bent reflection unit 210 located in the movement path of light for reflecting light and a reception unit 220 formed to communicate with the bent reflection unit 210, the reception unit 220 extending to deviate from the movement path of light. The reaction fluid F1 and the non-reaction fluid F2 may be disposed in the bent reflection unit 210 and the reception unit 220 to flow therebetween.

As described above, the variable reflector 200 includes the bent reflection unit 210 located in the movement path of light and the reception unit 220 extending to deviate from the movement path of light. The bent reflection unit 210 is formed to be bent such that incident light is reflected thereby and exits to the outside.

That is, as may be seen from FIG. 1, the bent reflection unit 210 is located to correspond to the direction in which light is emitted from the light source unit 100, and the reception unit 220 is formed to be located on the side opposite to the emission direction of light. The bent reflection unit 210 extends to the reception unit 220 such that the reaction fluid F1 and the non-reaction fluid F2 can flow therebetween. As a result, the reaction fluid F1 and the non-reaction fluid F2 flow between the bent reflection unit 210 and the reception unit 220. The reaction fluid F1 for light reflection or the non-reaction fluid F2 is disposed in the bent reflection unit 210, whereby the exit direction of light is determined. The reception unit 220 is formed to deviate from the movement path of light, whereby the fluid which is not disposed in the bent reflection unit 210 is disposed in the reception unit 220 such that the movement of light is not affected. Furthermore, the bent reflection unit 210 and the reception unit 220 are located to surround the light source unit 100, whereby the size of the overall layout is reduced.

The electromagnet unit 300 is mounted at the reception unit 220. When magnetism is generated from the electromagnet unit 300, the reaction fluid F1 may move and may be disposed in the reception unit 220, and the non-reaction fluid F2 may be disposed in the bent reflection unit 210.

The bent reflection unit 210 may include a reflection panel 211 extending from the reception unit 220 and formed to be bent such that incident light is reflected thereby and exits to the outside, a transparent panel 212 extending from the reception unit 220, spaced from the reflection panel 211 toward the light source unit 100, and formed to be bent for transmitting light, and a lens 213 connecting the transparent panel 212 and the reflection panel 211 for defining an internal space in which the reaction fluid F1 and the non-reaction fluid F2 are disposed.

As may be seen from FIG. 1, the bent reflection unit 210 includes the reflection panel 211, the transparent panel 212, and the lens 213 to define an internal space in which the reaction fluid F1 or the non-reaction fluid F2 is disposed. Here, the reflection panel 211 is formed to be bent and is configured to reflect light such that incident light exits to the outside. Furthermore, the transparent panel 212 may be configured to transmit light and may be formed to be bent such that light exits to the outside when the fluid for reflecting light, which is one of the reaction fluid F1 and the non-reaction fluid F2, is disposed in the internal space. That is, when the bent reflection unit 210 is filled with the fluid for reflecting light, which is one of the reaction fluid F1 and the non-reaction fluid F2, light may be reflected according to the bent shape of the transparent panel 212, and when the bent reflection unit 210 is filled with the fluid for transmitting light, which is the other of the reaction fluid F1 and the non-reaction fluid F2, light may be transmitted through the transparent panel 212 and the fluid and may then be reflected by the reflection panel 211.

As a result, the exit direction of light which is reflected by the transparent panel 212 due to the reaction fluid F1 or the non-reaction fluid F2 filling the internal space of the bent reflection unit 210 and then moves is different from the exit direction of light which is transmitted through the non-reaction fluid F2 or the reaction fluid F1, is reflected by the reflection panel 211, and then moves, whereby it is possible to change the movement direction of light that exits to the outside.

Figure 3:
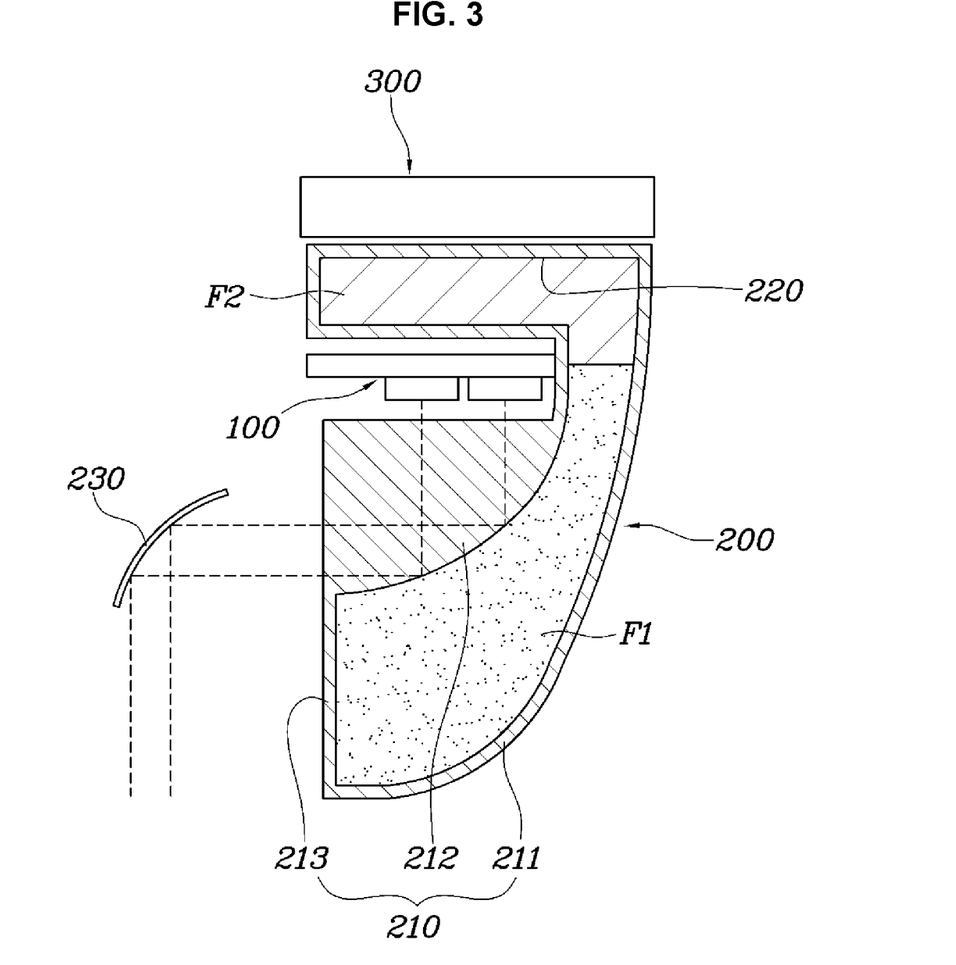

Meanwhile, as shown in FIG. 3, the variable reflector 200 may further include an additional reflection unit 230 disposed to correspond to the exit direction of light which is reflected by the reflection panel 211 or the transparent panel 212 and then moves for changing the exit direction of incident light.

The additional reflection unit 230 is provided to change the exit direction of light depending on the function of a lamp. The movement path of light that finally exits may be changed by the additional reflection unit 230.

That is, referring to FIG. 3, when the electromagnet unit 300 is turned off, whereby the reaction fluid F1 is disposed in the bent reflection unit 210, light emitted from the light source unit 100 is reflected by the transparent panel 212 of the bent reflection unit 210 due to the reaction fluid F1 and then moves. Since the additional reflection unit 230 is disposed to correspond to the exit direction of light which is reflected by the transparent panel 212 and then moves, the movement path of light is changed by the additional reflection unit 230.

On the other hand, when the electromagnet unit 300 is turned on, whereby the reaction fluid F1 is disposed in the reception unit 220 and the non-reaction fluid F2 is disposed in the bent reflection unit 210, light emitted from the light source unit 100 is transmitted through the transparent panel 212 and the non-reaction fluid F2, is reflected by the reflection panel 211, and then moves.

In the present way, the movement path of light may be changed by the additional reflection unit 230 included in the variable reflector 200, whereby it is possible to realize various functions of a lamp.

Meanwhile, as shown in FIG. 4, the variable reflector 200 may further include a color lens unit 240 disposed so at to correspond to the exit direction of light which is reflected by the reflection panel 211 or the transparent panel 212 and then moves for changing the color of incident light.

The color lens unit 240 is provided to change the color of light depending on the function of a lamp. The color of light that finally exits may be changed by the color lens unit 240.

That is, referring to FIG. 4, when the electromagnet unit 300 is turned off, whereby the reaction fluid F1 is disposed in the bent reflection unit 210, light emitted from the light source unit 100 is reflected by the transparent panel 212 of the bent reflection unit 210 due to the reaction fluid F1 and then moves. Since the color lens unit 240 is disposed to correspond to the exit direction of light which is reflected by the transparent panel 212 and then moves, the color of light is changed by the color lens unit 240.

On the other hand, when the electromagnet unit 300 is turned on, whereby the reaction fluid F1 is disposed in the reception unit 220 and the non-reaction fluid F2 is disposed in the bent reflection unit 210, light emitted from the light source unit 100 is transmitted through the transparent panel 212 and the non-reaction fluid F2, is reflected by the reflection panel 211, and then moves. As a result, light exits in the state of maintaining its inherent color.

In the present way, the color of light may be changed by the color lens unit 240 included in the variable reflector 200, whereby it is possible to realize various functions of a lamp.

Meanwhile, the bent reflection unit 210 may be formed to extend to the light source unit 100, and may be formed such that the section of the bent reflection unit 210 facing the light source unit 100 is planar. As the bent reflection unit 210 is formed to extend to the light source unit 100, the thickness of the transparent panel 212 forming the bent reflection unit 210 may be increased. Furthermore, the density of the bent reflection unit 210 may be adjusted depending on the thickness of the bent reflection unit 210, whereby the density of the bent reflection unit 210 may be adjusted to be similar to that of the reaction fluid F1 or the non-reaction fluid F2.

That is, when light emitted from the light source unit 100 is incident on the reaction fluid F1 or the non-reaction fluid F2, the light may be refracted, whereby the movement path of the light may be changed. Here, differences in the refractive index and reflectance of light between the reaction fluid F1 and the non-reaction fluid F2 occur due to a difference in the density therebetween. Consequently, the thickness of the bent reflection unit 210 may be adjusted to have density similar to that of the reaction fluid F1, whereby the amount of refraction may be adjusted such that light emitted from the light source unit 100 is incident on the bent reflection unit 210 along a specific path. Furthermore, the section of the bent reflection unit 210 that faces the light source unit 100 is planar, whereby light may be incident on the bent reflection unit 210 while exhibiting linearity.

Furthermore, as shown in FIG. 5, the bent reflection unit 210 may be provided at the end portion thereof from which light exits with a plurality of protrusions 214 for diffusing exit light.

The protrusions 214 are provided to diffuse light depending on the function of a lamp. Light that finally exits may be diffused by the protrusions 214 formed at the bent reflection unit 210.

That is, referring to FIG. 5, when the electromagnet unit 300 is turned off, whereby the reaction fluid F1 is disposed in the bent reflection unit 210, light emitted from the light source unit 100 is reflected by the transparent panel 212 of the bent reflection unit 210 due to the reaction fluid F1 and then moves. Since the protrusions 214 are formed at the transparent panel 212 of the variable reflector 200, light exits while being diffused.

On the other hand, when the electromagnet unit 300 is turned on, whereby the reaction fluid F1 is disposed in the reception unit 220 and the non-reaction fluid F2 is disposed in the bent reflection unit 210, light emitted from the light source unit 100 is transmitted through the transparent panel 212 and the non-reaction fluid F2, is reflected by the reflection panel 211, and then moves.

In the present way, the bent reflection unit 210 according to the various exemplary embodiments may realize various functions of a lamp using various additional components.

Meanwhile, as various exemplary embodiments of the present invention, as shown in FIG. 6 and FIG. 7, the variable reflector 200 may include a linear reflection unit 250, formed to extend the movement path of light for reflecting incident light such that the light exits to the outside, and an internal reception unit 260, formed to communicate with the linear reflection unit 250, the internal reception unit 260 being formed to deviate from the movement path of light.

The reaction fluid F1 and the non-reaction fluid F2 may be disposed in the linear reflection unit 250 and the internal reception unit 260 to flow therebetween.

As described above, the variable reflector 200 includes the linear reflection unit 250 formed to extend the movement path of light and the internal reception unit 260 formed to deviate from the movement path of light. When light is emitted from the light source unit 100, therefore, the light is incident in the longitudinal direction of the linear reflection unit 250, is reflected in the linear reflection unit 250, and then exits to the outside. Since the reaction fluid F1 and the non-reaction fluid F2 are disposed in the linear reflection unit 250 and the internal reception unit 260 to flow therebetween, the exit direction of light may be adjusted depending on whether the fluid for reflecting light, which is one of the reaction fluid F1 and the non-reaction fluid F2, is disposed in the linear reflection unit 250.

As may be seen from FIG. 6, the linear reflection unit 250 and the internal reception unit 260 may be formed to extend linearly, and may be disposed to overlap each other. The electromagnet unit 300 may be mounted at the internal reception unit 260 such that, when magnetism is generated from the electromagnet unit 300, the reaction fluid F1 moves and is disposed in the internal reception unit 260 and the non-reaction fluid F2 is disposed in the linear reflection unit 250.

Since the linear reflection unit 250 and the internal reception unit 260 may be formed to overlap each other, the layout thereof may be reduced. Furthermore, since the linear reflection unit 250 and the internal reception unit 260 are formed to extend linearly, a light guide function, which is one of various functions of a lamp, may be realized. Here, the electromagnet unit 300 may be mounted at the internal reception unit 260. Since the linear reflection unit 250 and the internal reception unit 260 communicate with each other, the reaction fluid F1 and the non-reaction fluid F2 may be disposed in the linear reflection unit 250 or the internal reception unit 260.

In the present way, the reaction fluid F1 for light reflection or the non-reaction fluid F2 is disposed in the linear reflection unit 250, whereby the exit direction of light is determined. The internal reception unit 260 is formed to deviate from the movement path of light, whereby the fluid which is not disposed in the linear reflection unit 250 is disposed in the internal reception unit 260 such that the movement of light is not affected.

Meanwhile, the end portion 251 of the linear reflection unit 250, on which light emitted from the light source unit 100 is incident, may be formed to be inclined, whereby the movement path of light may be changed when the light is reflected by the reaction fluid F1 or the non-reaction fluid F2 filling the linear reflection unit 250. Furthermore, the linear reflection unit 250 may be provided at the section thereof that overlaps the internal reception unit 260 with a plurality of optics 252.

As an example, as shown in FIG. 6, when the electromagnet unit 300 is turned off, whereby the reaction fluid F1 is disposed in the linear reflection unit 250, light emitted from the light source unit 100 is reflected by the inclined end portion 251 due to the reaction fluid F1. That is, when the linear reflection unit 250 is filled with the fluid for reflecting light, which is one of the reaction fluid F1 and the non-reaction fluid F2, light may be reflected by the inclined end portion 251, whereby the movement direction of the light may be changed depending on the angle of the inclined end portion 251.

On the other hand, when the electromagnet unit 300 is turned on, whereby the reaction fluid F1 is disposed in the internal reception unit 260 and the non-reaction fluid F2 is disposed in the linear reflection unit 250, light emitted from the light source unit 100 is transmitted through the inclined end portion 251 and is incident in the longitudinal direction of the linear reflection unit 250. The incident light may be reflected by the optics 252 formed in the linear reflection unit 250, whereby light may exit to the outside in the longitudinal direction of the linear reflection unit 250, as shown in FIG. 7.

A plurality of variable reflectors 200, each of which includes a linear reflection unit 250 and an internal reception unit 260, may be combined to realize a light guide function.

As is apparent from the above description, a reflector device configured for vehicle lamps according to an exemplary embodiment of the present invention is configured for causing light to exit along a plurality of paths using a single light source and a single reflector. A fluid, the position of which is changed in a response to magnetism, is provided at the reflector such that the exit path of light is changed depending on the flow of the fluid, whereby it is possible to realize a lamp having various functions.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A reflector device for vehicle lamps, the reflector device comprising:
   a light source unit for emitting light;
   a variable reflector having therein a reaction fluid that reacts to magnetism and a non-reaction fluid that does not react to the magnetism,
   wherein the variable reflector further includes a first portion located in a movement path of the light emitted from the light source unit and a second portion located to deviate from the movement path of the light, and
   wherein the first portion located in the movement path of the light is configured to reflect incident light such that the light of the light source unit exits to an outside of the reflector device; and
   an electromagnet unit mounted at the variable reflector for selectively generating the magnetism to control a fluid flow of the reaction fluid such that the reaction fluid or the non-reaction fluid is selectively disposed in the movement path of the light, whereby the light of the light source unit is reflected by one of the reaction fluid and the non-reaction fluid or is transmitted through another of the reaction fluid and the non-reaction fluid and then reflected by the variable reflector to adjust an exit direction of the light,
   wherein the variable reflector includes:
   a bent reflection unit located in the movement path of the light for reflecting the light; and a reception unit formed to fluidically-communicate with the bent reflection the reception unit extending to deviate from the movement path of the light, wherein the electromagnet unit is disposed at an outside of the second portion located to deviate from the movement path of the light, wherein the bent reflection unit includes:
  a reflection panel extending from the reception unit and formed to be bent such that the light of the light source unit is reflected by the reflection panel and exits to an outside of the reflector device;
  a transparent panel extending from the reception unit, spaced from the reflection panel toward the light source unit without contact to the reflection panel, and formed to be bent for transmitting the light of the light source unit; and
  lens connecting an end of the transparent pantli ancL-pin end of the reflection panel for defining an internal space, and wherein the internal space defined by the transparent panel, the reflection panel and the lens and the reception unit forms a closed space in which the reaction fluid and the non-reaction fluid are disposed.

2. The reflector device of claim 1,
wherein the reaction fluid and the non-reaction fluid have different densities, the reaction fluid is polar, and the non-reaction fluid is nonpolar.

3. The reflector device of claim 1, wherein the reaction fluid and the non-reaction fluid are disposed in the bent reflection unit and the reception unit to flow therebetween.

4. The reflector device of claim 3,
wherein an exit direction of light which is reflected by the transparent panel due to the reaction fluid or the non-reaction fluid filling the internal space is different from an exit direction of light which is transmitted through the non-reaction fluid or the reaction fluid and is reflected by the reflection panel.

5. The reflector device of claim 4,
wherein the variable reflector further includes an additional reflection unit disposed to correspond to the exit direction of light which is reflected by the reflection panel or the transparent panel for changing an exit direction of incident light of the additional reflection unit.

6. The reflector device of claim 4,
wherein the variable reflector further includes a color lens unit disposed so as to correspond to the exit direction of light which is reflected by the reflection panel or the transparent panel for changing a color of incident light of the variable reflector.

7. The reflector device of claim 3,
wherein the bent reflection unit is located to correspond to a direction in which the light is emitted from the light source unit, the reception unit is formed to be located on a side opposite to an emission direction of light, and the bent reflection unit extends to the reception unit such that the reaction fluid and the non-reaction fluid are fluidically connected to each other to flow therebetween.

8. The reflector device of claim 3,
wherein the bent reflection unit is formed to extend to the light source unit, and is formed such that a section of the bent reflection unit facing the light source unit is planar.

9. The reflector device of claim 8,
wherein the bent reflection unit is provided at an end portion thereof from which light exits with a plurality of protrusions for diffusing the light exiting from the plurality of protrusions.

10. The reflector device of claim 3,
wherein the electromagnet unit is mounted at the reception unit such that, when the magnetism is generated from the electromagnet unit, the reaction fluid moves and is disposed in the reception unit and the non-reaction fluid is disposed in the bent reflection unit.

11. The reflector device of claim 1, wherein the variable reflector includes:
  a linear reflection unit formed to extend the movement path of the light for reflecting incident light such that the light exits to the outside of the reflector device; and
  an internal reception unit formed to fluidically-communicate with the linear reflection unit, the internal reception unit being formed to deviate from the movement path of the light, wherein the reaction fluid and the non-reaction fluid are disposed in the linear reflection unit and the internal reception unit to flow therebetween.

12. The reflector device of claim 11,
wherein an end portion of the linear reflection unit, on which the light emitted from the light source unit is incident, is formed to be inclined, Whereby the movement path of the light is changed when the light is reflected by the reaction fluid or the non-reaction fluid filling the linear reflection unit.

13. The reflector device of claim 11,
wherein the linear reflection unit and the internal reception unit are formed to extend linearly and are disposed to overlap each other, and wherein the electromagnet unit is mounted at the internal reception unit such that, when the magnetism is generated from the electromagnet unit, the reaction fluid moves and is disposed in the internal reception unit and the non-reaction fluid is disposed in the linear reflection unit.

14. The reflector device of claim 13,
wherein the linear reflection unit is provided at a section thereof that overlaps the internal reception unit, with a plurality of optics.

* * * * *